United States Patent [19]

Dean

[11] 3,863,690
[45] Feb. 4, 1975

[54] RADIATOR FILLER
[76] Inventor: John O. Dean, 370 N. 300 E., American Fork, Utah 84003
[22] Filed: June 11, 1973
[21] Appl. No.: 368,508

[52] U.S. Cl. ............ 141/364, 137/614.11, 220/86 R
[51] Int. Cl. ............................................. B65b 3/18
[58] Field of Search ........... 141/364, 365, 366, 363, 141/291–310; 220/86 R; 165/153, 165, 73; 137/614.11

[56] References Cited
UNITED STATES PATENTS

| | | | |
|---|---|---|---|
| 1,506,919 | 9/1924 | Corkran et al. | 141/366 |
| 1,799,552 | 4/1931 | Foutz | 165/73 |
| 2,147,699 | 2/1939 | Hardiman | 165/73 |
| 2,343,145 | 2/1944 | Heiney | 165/73 |
| 3,217,792 | 11/1965 | Montabone | 165/73 |

Primary Examiner—Houston S. Bell, Jr.
Attorney, Agent, or Firm—Criddle & Thorpe

[57] ABSTRACT

A filler tank and valving arrangement for adding water, antifreeze, or coolant comprising a mixture thereof into the cooling system of an internal combustion engine while high pressure exists within the cooling system. the invention includes a filler tank maintained by a service station or the vehicle owner, which filler tank has a filler stem portion associated therewith. The filler tank and the stem are respectively adapted to be connected to a valve unit that is installed in the engine cooling system as a replacement radiator cap or as a special hose connection between the radiator and block or in the radiator itself. With the filler tank and filler stem connected to the valve unit, elevation of the filler stem will allow fluid from the filler tank to flow into the cooling system while simultaneously equalizing the pressures within the cooling system and filler tank.

9 Claims, 6 Drawing Figures

3,863,690

RADIATOR FILLER

BRIEF DESCRIPTION OF THE INVENTION

1. Field of the Invention

This invention relates to apparatus for introducing liquid into a pressurized cooling system of an internal combustion engine.

2. Prior Art

Most automobile drivers and probably all service station attendants are familiar with automobile engine overheating and radiator "boil over." Faced with this situation, the automobile owner or service station attendant has essentially two choices. He can allow the vehicle to stand, cooling slowly until excess pressure conditions in the cooling system have been relieved, in which case the engine may be damaged by development of unequal stresses therein resulting from variations in cooling rates of the various engine components and then add the make-up coolant necessary to reduce the vehicle temperatures. Alternatively, he may remove the radiator cap, and, in so doing, possibly burn himself when antifreeze or other coolant is forced out with the escaping pressure of the cooling system. Clearly, the alternatives are both unsatisfactory. The present invention provides a simple, inexpensive filler tank and valving arrangement with which an engine cooling system can be filled with make-up liquid without the need for first reducing the pressure in the system.

In the past, as shown by U.S. Pat. Nos. 2,878,794 and 3,499,481, for example, the desirability of incorporating a separate hot liquid expansion tank for receiving overheated cooling system liquid has been recognized. In such devices, liquid is received in the expansion tank, cooled, and then re-introduced back into the cooling system without relieving the pressure in the system. These disclosed devices are intended to prevent liquid losses resulting from removal of the radiator cap, but they do not provide any way to introduce make-up liquid as replacement for any that may have been lost through leakage, etc. Also, the long, slow, cooling period necessary with these previously proposed systems is often objectionable.

The radiator filler of the present invention, unlike the above noted patented devices, is intended to provide a supplemental liquid supply to an engine cooling system while that system remains overheated and pressurized.

SUMMARY OF THE INVENTION

It is a principal object of the present invention to provide apparatus for introducing a supplemental supply of coolant liquid to an overheated internal combustion engine cooling system while that system remains in a pressurized state.

Another object is to provide a radiator filler having separate components that can be coupled together as required. The components include a valving arrangement to be easily installed in the cooling system of a vehicle and a filler tank separatable from the valving arrangement and conveniently maintained by a service station attendant or vehicle operator.

Still another object is to provide a valving arrangement for the radiator filler that can be easily installed and that requires no more than minor modifications to a standard radiator of an engine cooling system.

Still another object is to provide a radiator filler apparatus incorporating pressure relief valving.

Principal features of the present invention include a valve unit, preferably fabricated for coupling to the filling neck of a standard cooling system radiator, in the manner of a radiator cap. The valving arrangement is contained within a columnar housing that is compartmented by upper and lower lateral walls that extend across the housing interior and which walls have a rod slidable through the central portions thereof. The sliding rod has a dish-shaped valve head connected across its lower end to engage and seal against the edge of a filler opening of a standard radiator. A coil spring is arranged to bias the dish-shaped valve head against the edge of the radiator filler opening. The spring is selected to have a spring tension that is approximately equivalent to that commonly found in the pressure relief mechanism of a conventional radiator cap.

The connection of the valve head and sliding rod end is such that when a pressure force sufficient to overcome the coil spring, is exerted on the valve head, the head will slide a short distance upwardly along the stationary rod to allow pressure leakage therearound. The pressure moved past the valve head is blocked by a second valve head that is also secured to the sliding rod, and is directed out of an overflow line in the radiator filling neck when the first valve functions as a pressure relief radiator cap.

The second valve head projects radially outwardly from the sliding rod and is positioned between the upper and lower lateral walls. The sealing surface of the second valve head is arranged to close off passages formed through the lower lateral wall, and a second coil spring biases the second valve head into closing position over the openings. Openings are also formed through the upper lateral wall to allow free passage of liquid traveling around the second valve head.

A collar at the end of the sliding rod provides a means whereby the sliding rod is releasably coupled with the end of a filler tube of the filler tank. The filler tube slides within the filler tank and projects through the top thereof to provide a means whereby an operator can manually raise the tube and the connected sliding rod. The filler tank is releasably coupled to the valve unit housing by telescoping a bottom cylindrical neck portion thereof into a top end of the valve unit and connecting the filler tube end to the sliding rod collar. An inlet to the filler tank is closed with the usual radiator-type pressure cap. A filler tank valve head radiates from the filler tube and is adapted to seat on the filler tank wall surrounding the upper end of the cylindrical neck such that when the filler tube is raised, the respective filler tank valve head is also moved off its seat at the same time the first and second valve heads carried by the sliding rod are opened.

When an engine cooling system overheats, the pressure therein normally has to be relieved or equalized to permit free passage of liquid into the radiator. With the present invention, such a pressure equalization is provided for by aligned pressure bypass openings formed axially through the sliding rod and the filler tube. The bypass opening of the sliding rod terminates at a transverse opening through the side wall of the rod at a location below the second valve head. The bypass opening through the filler tube terminates at a transverse opening through the side wall of the tube at a point near the top of the filler tank. Lifting of the filler tube and sliding rod, in addition to opening the valves, as previously described, also opens the pressure bypass opening to receive pressure flow from the radiator. Radiator pressure conditions and pressures within the filler tank above the liquid level are thereby equalized to allow flow of make-up liquid contained in the filler tank into the radiator.

Additional objects and features of the invention will become apparent from the following detailed description, taken together with the accompanying drawings.

THE DRAWINGS

FIG. 1 is a fragmentary perspective view of an upper portion of a cooling system radiator with a radiator filler of the present invention installed thereto;

FIG. 2, a vertical section view taken on the line 2—2 of FIG. 1;

FIG. 3, a view like that of FIG. 2, but showing the interconnected filler tube and sliding rod portions thereof elevated to open the radiator to liquid flow from a filler tank;

FIG. 4, a partly sectional view showing valve unit and filler tank exploded apart;

FIG. 5, a horizontal sectional view taken on the line 5—5 of FIG. 4; and

FIG. 6, a horizontal sectional view taken on the line 6—6 of FIG. 4.

DETAILED DESCRIPTION

Figure 1:
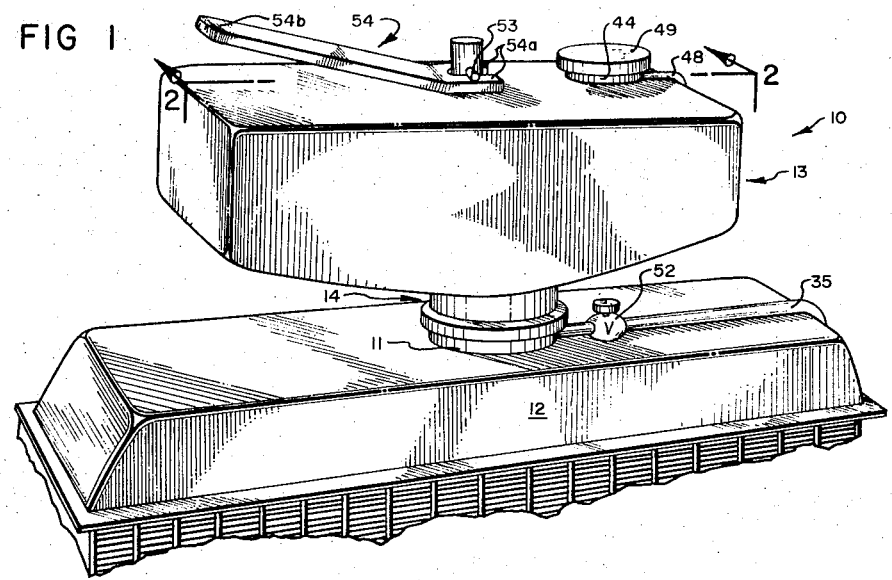

Referring now to the drawings:

In the illustrated preferred embodiment, the radiator filler 10 of the present invention, is shown in FIG. 1, installed on the neck 11 of a standard vehicle cooling system radiator 12. As shown best in FIGS. 2 and 3, the radiator filler 10 comprises a filler tank 13 adapted to be mounted above a valve unit 14 and to be coupled thereto at junction 15.

Figure 2:
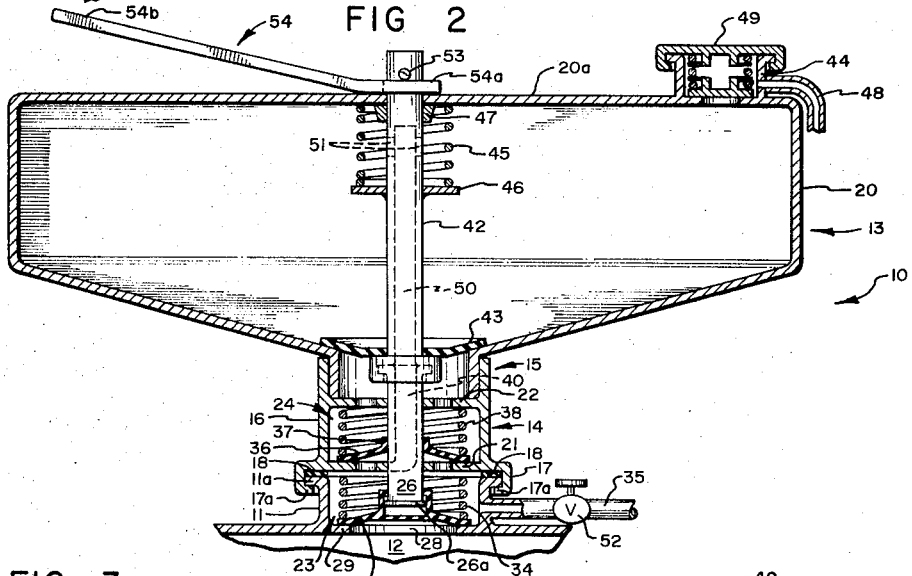
Figure 3:
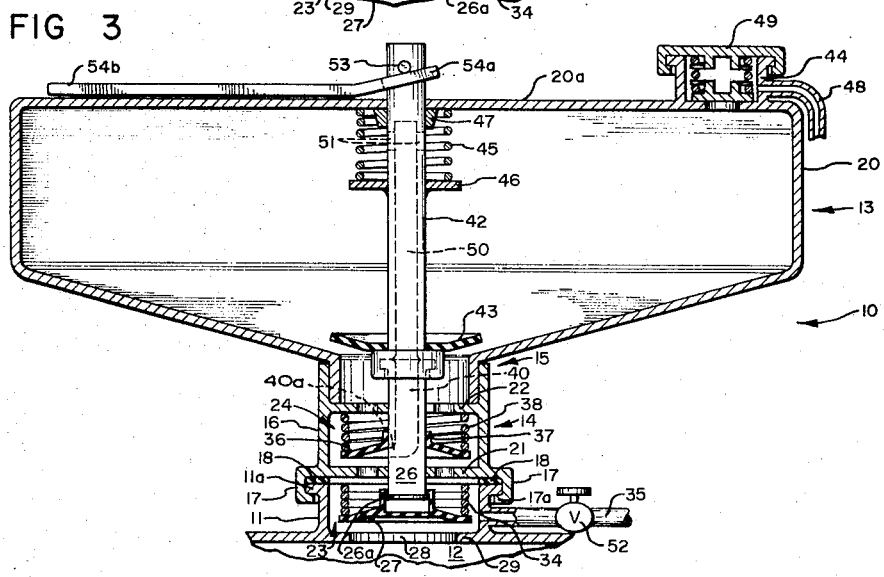
Figure 4:
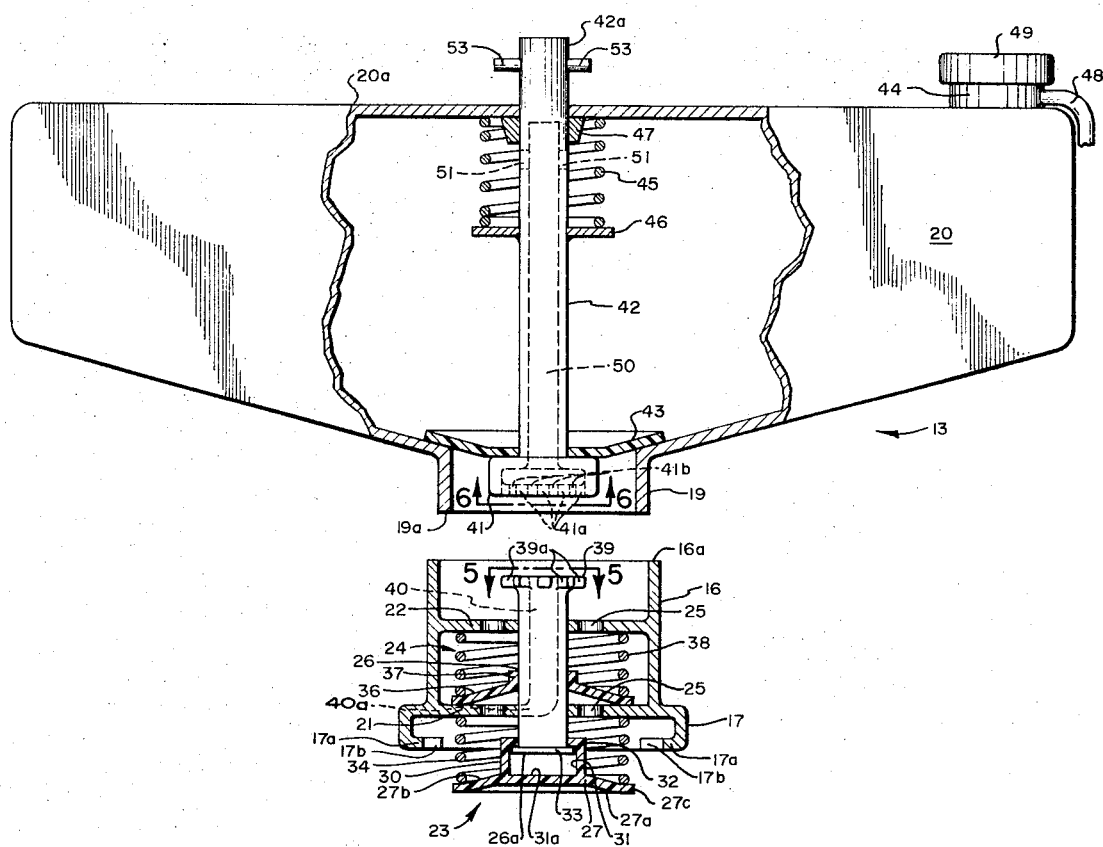

As shown in FIGS. 2 through 4, the preferred valve unit 14 is contained within a columnar cylindrical housing 16, that has a collar 17 secured around the lower edge thereof. The collar 17 has spaced, inwardly extending ears 17a that serve as coupling means for securing the valve arrangement to the standard radiator neck 11 in the same manner as does the usual radiator cap. Gaps 17b (FIG. 4) between the ears 17a, FIG. 4, provide for clearance of outwardly projecting lip sections 11a, FIGS. 2 and 3, of the radiator neck 11 as the housing 16 is placed on the radiator neck. With the radiator neck lip sections installed within the collar 17, twisting of the housing 16 and the respective ears 17a will move the ears beneath the filler neck lip sections 11a to lock the valve unit to the radiator filler neck. A ring-type pressure gasket 18 is preferably included within the collar 17 to provide a seal between the valve unit and the radiator neck.

Cylindrical housing 16 is open at its top 16a (FIG. 4) and has a straight cylindrical wall within which a cylindrical neck 19, FIG. 4, of a filler tank housing 20 is adapted to be telescoped.

Spaced lower and upper lateral walls 21 and 22, extend across the housing 16 and form compartments within the housing. A first valve assembly 23 includes the radiator neck 11 and a second valve assembly 24 is positioned thereabove, between the lateral walls. Each of the lateral wall 21 and 22 has openings 25, FIG. 4, formed therethrough for passing liquid and/or steam. A sliding rod 26, common to both of the valve assemblies 23 and 24, slides through center openings provided in both the lower and upper lateral walls.

Below the lower lateral wall 21 and extending across and radiating from the lower end 26a of the sliding rod 26, there is provided an inverted dish-shaped circular valve head 27 that comprises the valve head for the first valve assembly 23. The valve head 27 has a dish-shaped bottom face 27a (FIG. 4) at the side opposite to the junction with rod end 26a, which face 27a has a greater outside diameter than the diameter of a fill opening 28, so that the outer circumferential area of the valve head engages and seals against the edge 29 of the fill opening 28.

The top surface 27b of the valve head 27 has a central upstanding collar 30, and a peripheral outer edge 27c. The collar 30 has a central axial bore 31 formed therein and an inwardly extending flange 32 at the top of the bore. A sliding rod 26 extends into bore 31 such that an end 26a of the rod will engage a bottom 31a of the bore when the rod is fully lowered. A flange 33 is arranged to extend normal the side of the sliding rod 26 at the end 26a thereof and when the rod is raised, as shown in FIG. 3, the flange 33 will engage the flange 32 so that further upward travel of the rod will also raise the valve head 27.

Because of the loose connection between rod 26 and head 27, the valve head 27 can be displaced a short distance vertically along the sliding rod before the bottom 31a of the bore will engage sliding rod end 26a. A coil spring 34 surrounds the sliding rod 26 between the top 27b of the valve head 27 and the undersurface of the lower lateral wall 21, to bias the valve head such that the bottom face 27a engages and seals the fill opening edge 29.

When sufficient pressure exists within the radiator 12 to overcome the biasing of the coil spring 34 the valve head 27 will lift off its seat without raising the sliding rod. Liquid and/or steam within the radiator can thereafter pass around the valve head edge 27c, to be exhausted through a radiator overflow line 35, FIGS. 2 and 3. The valve head 27 and cooperating seat formed by edge 29 thus functions like a pressure relief valve portion of a standard pressure relief radiator cap. The spring 34 should therefore be selected to have approximately the same strength as does the pressure relief radiator cap intended for use with the particular radiator to which the present invention is installed.

The second valve assembly 24 of the valve unit 14 is positioned above the first valve assembly 23. In this assembly, a circular dish-shaped valve head 36 radiates from a central collar 37 to a peripheral edge 36a. The valve head 36 is large enough to cover openings 25 and a coil spring 38 is arranged around the sliding rod 26, between the top surface of the lower lateral wall 21 and the undersurface of the upper lateral wall 22, to bias the valve head 36 into engagement with wall 21 such that the openings 25 are sealed.

Figure 5:
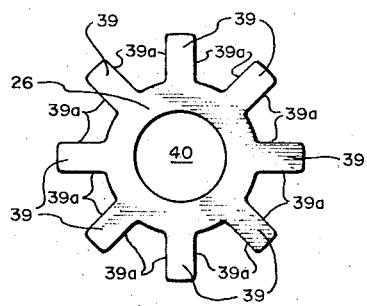
Figure 6:
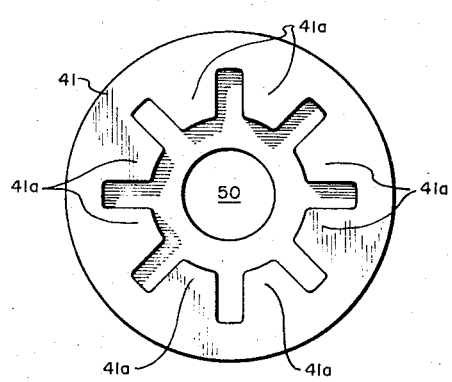

The rod 26, which, as noted, extends slidably through the lower and the upper lateral walls 21 and 22, has an outwardly extending collar 39 at its upper end. The collar 39, shown best in the exploded view of FIG. 4 and in FIG. 5, has spaced notches at 39a formed therearound that are arranged to pass inwardly projecting spaced flange sections 41a (FIG. 6) that extend inwardly from around the bottom of a sleeve 41 of a filler tube 42.

An axial passage 40 extends from the collar 39 through the rod to a lateral passage 40a that exits the side of the sliding rod at a point that is below the valve head 36. The lateral passage 40a is aligned with the edge of the lower lateral wall 21 when the first and second valve units 23 and 24 are respectively seated over the fill opening 28 and openings 25 in the lower lateral wall 21, as shown in FIG. 2. Flow through passages 40a and 40 can occur when rod 26 is moved upwardly to position the lateral passage 40a above the level of the lower lateral wall 21, as shown best in FIG. 3.

Filler tank 13 is preferably fabricated as a separate unit that is intended to be installed with the valve arrangement 14 when it is desired to add supplemental or make-up liquid to the radiator 12. During normal engine operation with the valve arrangement 14 installed, as described, over the radiator neck, a dust cover or the like, not shown, is preferably installed over the top end 16a of the housing 16 when the filler tank is not being used.

In use, the filler tank 13 is coupled to the valve assembly by telescoping the cylindrical neck 19 of the filler tank housing 20 into the open top end 16a of the housing 16 until the bottom edge 19a contacts the top of the upper lateral wall 22. So positioned, a sleeve 41 (FIG. 6) at the lower end of a filler tube 42 rests on top of the sliding rod collar 39. Appropriate positioning of the filler tube 42 and sleeve will place flange sections 41a of sleeve 41 in alignment with notched-out portions 39a of the collar such that the flange section 41a will pass through the collar notched-out portions 39a and the top of collar 39 will engage the lower end of the filler tube. Rotation of the filler tube will then move the flange sections 41a into locking arrangement beneath the collar 39. The end 42a of the filler tube 42 extends through the filler tank housing top 20a to provide means whereby an operator can exert a lifting force to open the filler tank and valve arrangement to flow therethrough, as will be hereinafter further described.

Filler tube 42 has an outwardly extending, inverted, dish-shaped filler tank valve head 43 fixed thereto immediately above the sleeve 41. The valve head 43 has a diameter that is greater than the internal diameter of the cylindrical neck 19 such that, when the filler tube is moved downwardly, the valve head will seal over the cylindrical neck. A center axial passage 50 extends through the sleeve 41 and is aligned with the sliding rod passage 40 when the sleeve 41 and collar 39 are coupled. A transverse passage 51 intersects passage 50 (FIG. 4) at a point above the normal level of make-up liquid placed in the filler tank 13.

When the filler tank valve head 43 seals the cylindrical neck 19, the filler tank can be filled with an appropriate liquid (i.e., water, water and antifreeze, etc.) through an inlet neck 44 arranged in the top 20a of housing 20. A coil spring 45 surrounds the filler tube 42 and acts between a collar 46 that radiates from the filler tube 42, and the undersurface of the housing top 20a. The spring 45 thus biases the valve head 43 against the cylindrical neck 19. A gasket 47, FIGS. 2 through 4, preferably of Neoprene or a similar material is connected to the undersurface of the housing top 20a and serves as a pressure seal through which the filler tube 42 reciprocates. An overflow line 48 connects into the side of the inlet neck 44 and a standard pressure relief cap 49 is provided to close the neck. The pressure relief cap 49 will expose the open end of the overflow line 48 so as to provide a path for pressure flow should an over-pressure condition come to exist therein.

When the sliding rod and the filler tube are coupled, their passages 40 and 50 provide a continuous central passage through which pressurized liquid and/or steam from the radiator can travel upon opening of the first valve assembly 23. Such pressurized liquid and/or steam, after passing around the valve head 36 will enter the connected passages 40 and 50 through the lateral passage 40a below the valve head 36 and will exit into the filler tank 13 through the transverse passage 51, thereby equalizing pressure between the radiator and above the liquid level in the filler tank.

A valve 52 is provided in the usual radiator overflow line 35 to be used to close off flow therethrough during filling of the radiator from the filler tank 13 so that there will not be any pressure and liquid loss through the overflow line 35 during use of the filler tank. However, valve 52 should be open to pass liquid and/or steam therethrough when the valve unit 14 is installed to the radiator neck 11 as a pressure relief radiator cap. In the event that valve 52 is inadvertently left closed and a high pressure condition develops within the radiator 12, the resultant pressure build-up will eventually elevate the valve head 27, move the bottom 31a against the end 26a of the sliding rod 26 and then lift the rod to open both the first and second valve assemblies 23 and 24 to provide a path of exhaust flow from the radiator 12 out through opening 28.

Lugs 53 extend outwardly from the top of the filler tube proximate to the top end 42a thereof, and above the end of the passage 50. The lugs provide means for engaging the filler tube 42 to turn or elevate it as has been described. Lugs 53 may be held between an operator's fingers to turn or elevate the filler tube, but preferably will be engaged by forks 54a of an angled lever 54, FIGS. 2 and 3. When the lever 54, as shown in FIG. 3, has a downward pressure applied to the handle end 54b thereof, the forks 54a are pivoted upwardly against the lugs 53 to elevate the filler tube.

A preferred valve unit 14 of the radiator filler 10 has been shown herein installed in the manner of a radiator cap to a standard radiator of an engine cooling system. Obviously, the valve arrangement could as easily be fabricated into the radiator itself; could be arranged in a liquid transfer hose, passing liquid from the radiator to the internal combustion engine; or could even be fabricated on the engine itself as part of the cooling system.

Additonally, the valve arrangement 14 could be permanently installed in the engine cooling system, with the filler tank 13 permanently connected thereto. So arranged, with make-up liquid contained in the filler tank 13, should a pressure build-up come to exist within the engine cooling system, that pressure would eventually elevate the respective valve heads 27 and 36 against their respective spring biasing to open the valve arrangement 14. Thereafter, pressure would be equalized as has been described between the filler tank and cooling system, and the make-up water would flow into said cooling system. Later the filler tank 13 could be again filled with a make-up liquid for future passage, as needed, into the engine cooling system.

Although a preferred form of my invention has been herein disclosed, it is to be understood that the present disclosure is made by way of example and that variations are possible without departing from the subject matter coming within the scope of the following claims, which subject matter I regard as my invention.

I claim:

1. A radiator filler comprising
   a valve assembly including a valve housing;
   connection means for coupling said valve housing into a cooling system of an internal combustion engine;
   valve means within said valve housing for selectively opening and closing off fluid passage therethrough;
   a filler tank housing having a depending neck portion;
   means for connecting said depending neck portion to said valve housing above said valve means;
   a filler opening in said filler tank housing through which liquid is introduced into said tank housing;
   cap means for releasably closing said filler opening;
   a filler tube slidably extending through said filler tank housing and into said neck portion;
   filler tank means secured to said filler tube and arranged to close said filler tank neck portion to control liquid passage from said filler tank housing to said upstanding first housing around said filler tube;
   means for coupling said valve means in said valve housing to said filler tube such that movement of said filler tube will open said filler tank valve means and said valve means in the valve housing; and
   means for admitting pressure from said valve housing to an upper portion of said filler tank housing when said valve means in said housing is opened.

2. A radiator filler as recited in claim 1, wherein the valve housing includes a check valve and is connected as a pressure relief radiator cap to the filler neck of a radiator.

3. A radiator filler as recited in claim 2, wherein the valve means arranged in said valve housing consists of
   the check valve arranged to seat around a fill opening in the radiator filler neck;
   a second valve head stacked above said first valve head in said valve housing;
   a lateral wall arranged across said valve housing between said check valve and said second valve head;
   a valve seat surrounding an opening formed through said lateral wall immediately opposite to said second valve head;
   a sliding rod coupled to said check valve and to said second valve head, said sliding rod being arranged to travel through said lateral wall to move said check valve and second valve head off from around said radiator fill opening and said valve seat in the lateral wall respectively; and
   means for biasing said first and second valve heads against said radiator fill opening and against said valve seat in the lateral wall, respectively.

4. A radiator filler as recited in claim 3, wherein the check valve is loosely connected to slide upwardly along the lower end portion of the sliding rod before further movement of the check valve will displace the rod upwardly; and further including
   an overflow line connected into the radiator filler neck above the fill opening therein, whereby pressure is exhausted through the overflow line when said check valve is elevated by a pressure build-up within said radiator; and
   valve means arranged in said overflow line for controlling flow therethrough.

5. A radiator filler as recited in claim 3, wherein the means for coupling the valve means in the valve housing to the tank valve means consists of
   a coupling collar secured on the end of the sliding rod opposite to its connection to the check valve; and
   a mating sleeve arranged on end of the filler tube below the filler tank valve means for receiving and releasably securing said coupling collar therein.

6. A radiator filler as recited in claim 5, wherein the means for passing pressure from said valve housing to the filler tank housing consists of
   an axial passage formed in said sliding rod and extending downwardly from the coupling collar to terminate in a transverse passage formed in the side of said rod means below the second valve head; and
   an axial passage formed through the filler tube and extending from the mating sleeve upwardly to a transverse passage formed through the tube wall at a location just below the top of the filler tank housing.

7. A radiator filler as recited in claim 6, further including
   lugs projecting outwardly from the end of the filler tube that extend from the filler tank housing; and
   forked lever means for engaging said lug to elevate the filler tube.

8. A valve unit for a vehicle cooling system radiator comprising a valve housing;
   means for releasably and sealingly connecting a lower end of said valve housing to a radiator filler neck of said radiator;
   valve means arranged in said valve housing, above a fill opening in said radiator filler neck, said valve means comprising a lateral wall arranged in the upstanding housing and having a central opening therethrough;
   a rod extending slidably through the lateral wall;
   spaced first and second valves, each having a valve head connected to the rod means and with the seat for the first valve surrounding an opening in the radiator filler neck and the seat for the second valve surrounding the central opening through said lateral wall; and
   means resiliently biasing each of the valve heads to its associated valve seat.

9. A valve unit as recited in claim 8, further including means slidably coupling the head of the first valve to the rod whereby the head of said first valve is movable a short distance upwardly in response to a level of pressure existing within the radiator, before engaging the rod to thereafter move the rod and the second valve head attached thereto.

* * * * *